Patented Feb. 7, 1928.

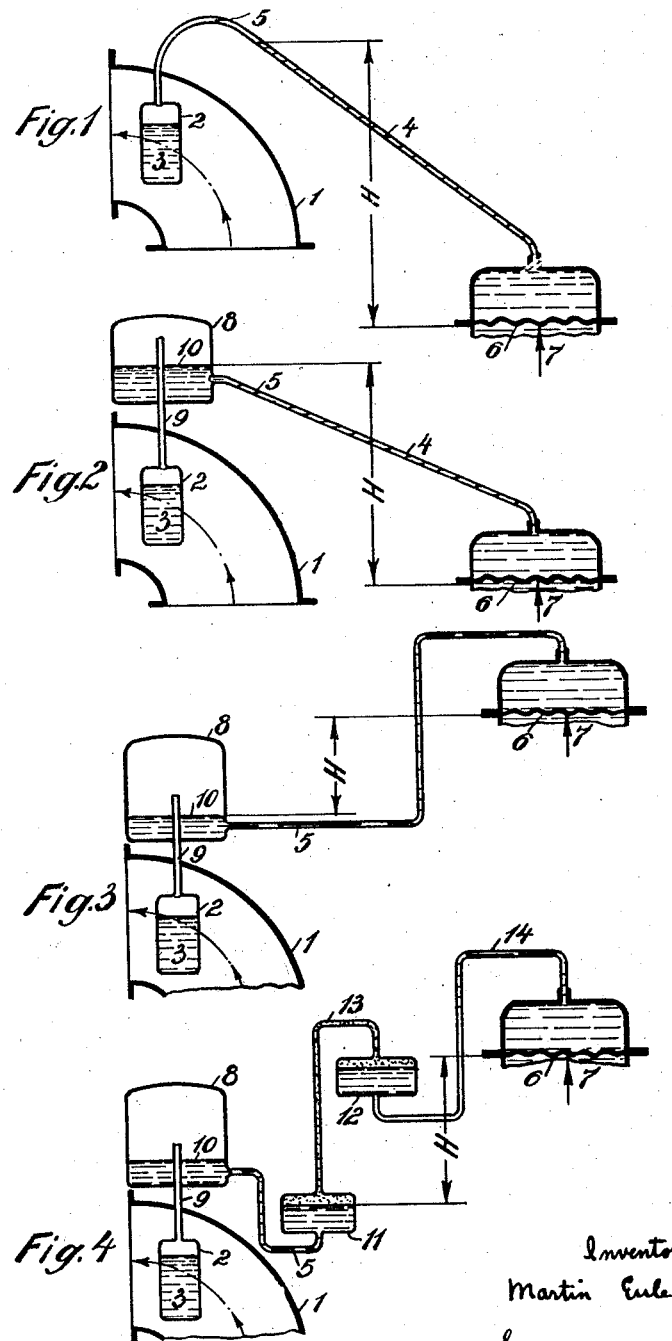

1,658,375

UNITED STATES PATENT OFFICE.

MARTIN EULE, OF SPANDAU, GERMANY, ASSIGNOR TO SIEMENS-SCHUCKERTWERKE GESELLSCHAFT MIT BESCHRANKTER HAFTUNG, OF SIEMENSSTADT, NEAR BERLIN, GERMANY, A CORPORATION OF GERMANY.

DEVICE FOR REGULATING THE GENERATION OF STEAM IN HEAT POWER PLANTS.

Application filed July 30, 1926, Serial No. 125,984, and in Germany August 7, 1925.

My invention relates to devices for regulating the generation of steam in heat power plants.

It has already been proposed to regulate heat power plants not directly by the pressure or the temperature of the operating or working fluid, but to let the working fluid act upon an auxiliary liquid which it evaporates and which in its turn acts upon the regulating device through a transmission liquid. My invention relates to a further development of this system.

My invention has the purpose of eliminating the static pressure produced by heavy liquid columns in case appreciable differences in height exist between the vessel containing the auxiliary liquid and the regulating device which is actuated by a transmission liquid responding to the varying pressures of the auxiliary liquid vapor.

In the accompanying drawing I have illustrated in more or less diagrammatic from, an arrangement in which my improvement is embodied.

Referring to this drawing, the operating medium to be controlled, for instance the temperature of the steam in a steam power plant, passes through the service pipe 1. In this pipe is located a vessel 2 which contains an auxiliary liquid, for instance mercury. A discharge pipe 9 for the mercury vapor produced, rises from vessel 2, and passing outside of pipe 1 terminates in a compensating vessel 8 above the sealing liquid 10 contained therein. The purpose of this sealing liquid is to prevent the escape of the auxiliary vapors into the remainder of the control system. This sealing liquid 10 may, for instance, also be mercury, in other words a liquid of great specific weight. It is the object to transfer the vapor pressure created by the boiling of the auxiliary liquid 3 to a control device 6, 7 by which the temperature of the operating medium may be regulated. Devices of this character are well known in the art and their further construction beyond the corrugated diaphragm 6 is not shown. It is assumed that this control device 6, 7 is located appreciably higher than the auxiliary vessel 2. If now the control device 6, 7 were directly connected by a pipe line with the lower portion of compensating vessel 8 so that the liquid 10 in vessel 8 would fill the entire space of the connection and of the control device 6, 7, it would be necessary for the pressure produced by the auxiliary vapor to first overcome the entire static pressure due to the difference in level H before it can exert a pressure on the diaphragm 6 of the control device. For instance if this difference in height should amount to two meters and if mercury should be used as the sealing liquid 10, which is quite desirable for many reasons, a pressure of almost three atmospheres would be necessary in order to overcome the static pressure due to the height H of two meters. Since the boiling pressure of mercury at three atmospheres presumes already a very high temperature, the use of mercury would be almost impossible in many cases, though otherwise desirable, since it would not be possible to produce the boiling pressure necessary for overcoming the aforementioned static pressure of the mercury column.

In order to render the device within very wide limits independent of any substantial height of the control device above the auxiliary vessel, I propose to connect an intermediate vessel 11 with the compensating vessel 8 by way of a pipe line 5. This vessel is partly filled with the heavy sealing liquid 10, for instance mercury, and partly with a specifically lighter transfer liquid, for instance oil. Between intermediate vessel 11 and the control device is disposed another intermediate vessel 12. The oil is contained in the connection 13 between vessels 11 and 12, whereas the connection 14 between vessel 12 and the control device 6, 7 may again be filled with specifically heavier liquids such as mercury. Intermediate vessel 12 is located higher than vessel 11. The steam or vapor escaping from the sealing liquid 3 presses upon the liquid 10 in the compensation receptacle 8 and this liquid transfers its pressure first to the specific lighter interposed liquid 13 and from there to the heavy liquid in receptacle 12 which is connected by pipe 14 with the control device 6, 7 previously mentioned. The difference in elevation H is dealt with by the pipe 13 without particularly large forces being required, since the specific weights when mercury and oil, for instance, are employed are as 13.6:1.

The employment of compensation vessels thus offers the possibility to render the regulating device independent of external influences and construction limitations.

If desired, it is of course also possible to operate the control device 6, 7 directly with the lighter liquid, for instance oil, and in that case intermediate receptacle 12 may be omitted and pipe 13 may be directly connected to device 6, 7. This is an obvious modification and illustration thereof has, therefore, been omitted.

Various modifications and changes may be made without departing from the spirit and the scope of the invention, and I desire, therefore, that only such limitations shall be placed thereon as are imposed by the prior art.

I claim as my invention:—

1. In an apparatus for controlling the temperature of an operating medium, the combination of a vessel containing an auxiliary liquid exposed to the operating medium, a compensating vessel having a connection with the auxiliary vessel to receive the vapors of the auxiliary liquid, a control device for controlling the temperature of the medium, located an appreciable distance above said compensating vessel and being actuated by the varying vapor pressure of the auxiliary liquid, a sealing liquid in said compensating vessel for preventing the escape of the auxiliary vapor from the said vessel and a communication between the compensating vessel and the control device containing at least one intermediate transfer vessel and a transfer liquid lighter in weight than the sealing liquid.

2. In an apparatus for controlling the temperature of an operating medium, the combination of a vessel containing an auxiliary liquid exposed to the operating medium, a compensating vessel having a connection with the auxiliary vessel to receive the vapors of the auxiliary liquid, a control device for controlling the temperature of the medium, located an appreciable distance above said compensating vessel and being actuated by the varying vapor pressure of the auxiliary liquid, a sealing liquid in said compensating vessel for preventing the escape of the auxiliary vapor from the said vessel and a communication between the compensating vessel and the control device containing an intermediate transfer vessel located lower than the compensating vessel and a second transfer vessel located in height between the compensating vessel and the control device, the space between said two transfer vessels containing a transfer liquid specifically lighter than the sealing liquid and the space between the second transfer vessel and the control device containing a liquid specifically heavier than the transfer liquid.

In testimony whereof I affix my signature.

MARTIN EULE.